Nov. 18, 1969   R. SCHULTZ   3,479,557
AUTOMOTIVE HEADLAMP SAFETY SYSTEM WITH THE ALTERNATE
SUBSTITUTION OF FILAMENT
Filed Dec. 31, 1968   3 Sheets-Sheet 1

INVENTOR.
RUDD SCHULTZ.
BY
John H. Oltman
ATT'Y.

Nov. 18, 1969 R. SCHULTZ 3,479,557
AUTOMOTIVE HEADLAMP SAFETY SYSTEM WITH THE ALTERNATE
SUBSTITUTION OF FILAMENT
Filed Dec. 31, 1968 3 Sheets-Sheet 2
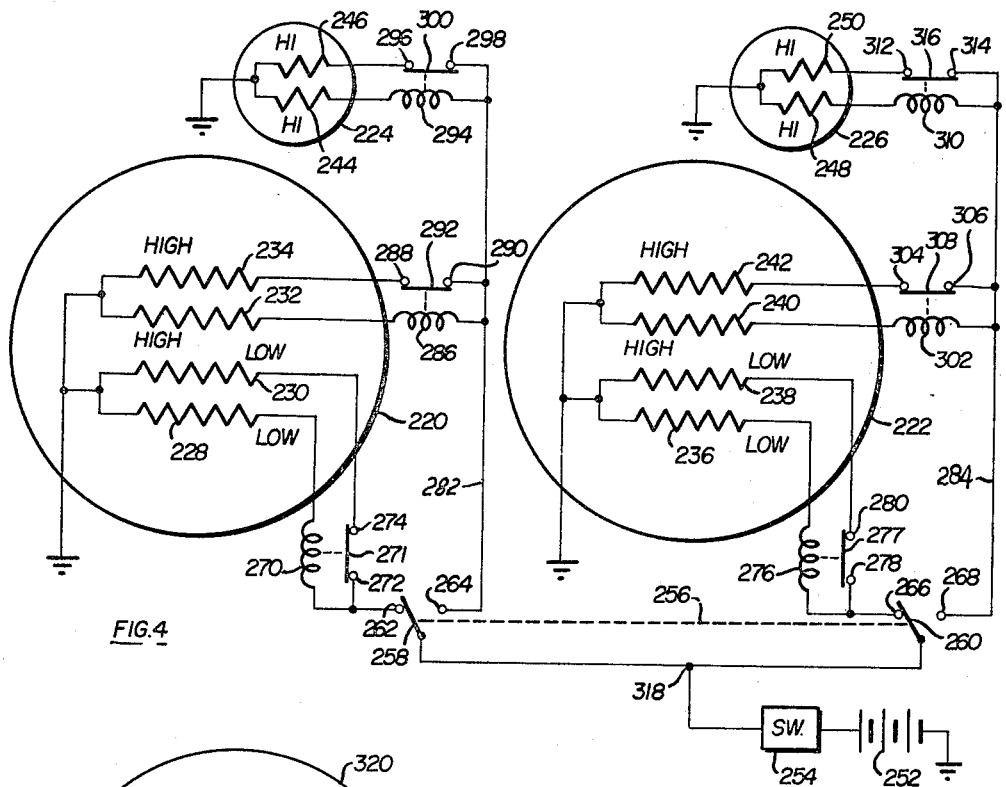
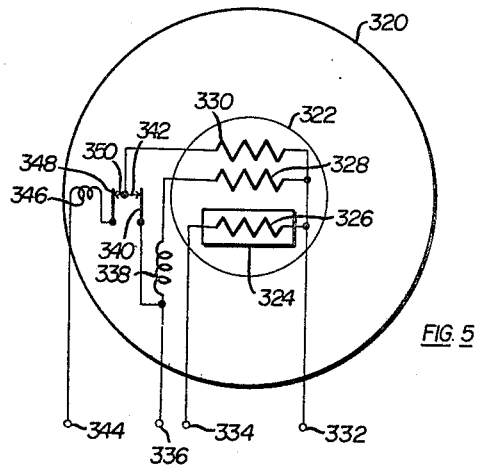
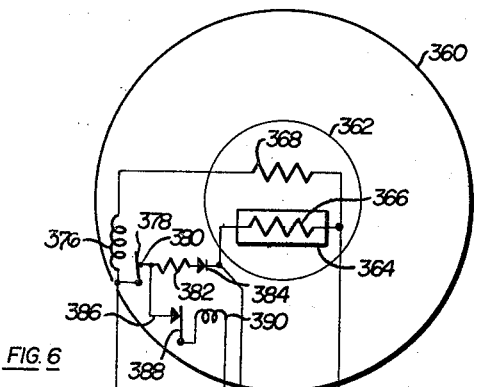
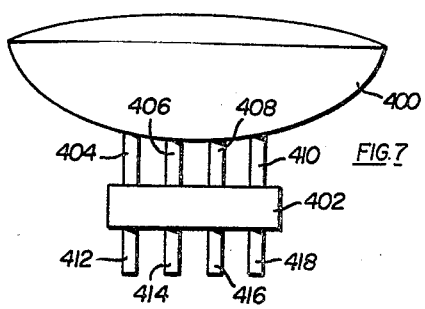
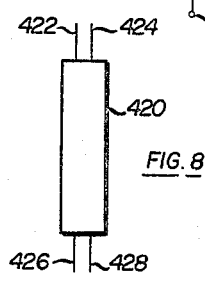
INVENTOR.
RUDD SCHULTZ.
BY John H. Oltman
ATT'Y.

INVENTOR.
RUDD SCHULTZ.
BY John H. Oltman
ATT'Y.

United States Patent Office 3,479,557
Patented Nov. 18, 1969

3,479,557
AUTOMOTIVE HEADLAMP SAFETY SYSTEM WITH THE ALTERNATE SUBSTITUTION OF FILAMENT
Rudd Schultz, 611 SE. 18th Ave., Pompano Beach, Fla. 33062
Filed Dec. 31, 1968, Ser. No. 788,163
Int. Cl. B60g *1/02*
U.S. Cl. 315—83     11 Claims

ABSTRACT OF THE DISCLOSURE

One or more lamps of an automotive vehicle having at least two filaments is provided with a control system which operates when one of the filaments burns out to keep the lamp lit at a safe intensity. The two filaments of a given lamp may be a low beam filament and a high beam filament, and in this case, the control circuit includes a current limiting element and a switching device connected to provide switching from the low beam filament to the high beam filament if the low beam filament burns out and to simultaneously limit current flow through the high beam filament to reduce its brightness to a safe level. Alternatively, the lamp may have two low beam filaments plus at least one high beam filament, and in this case the control circuit provides switching from one low beam filament to the other if the first low beam filament burns out. If two high beam filaments are provided in the same lamp, the circuit controls them in the same manner as the low beam filaments.

BACKGROUND OF THE INVENTION

Figure 1:
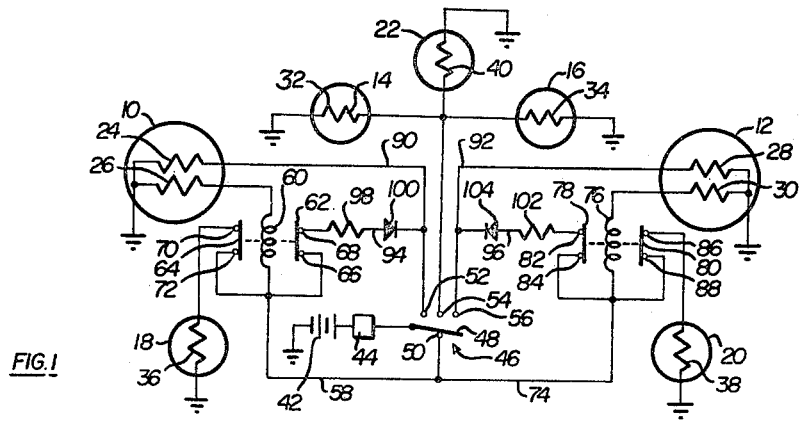

It has previously been proposed to provide automotive headlamps of the type having a low beam filament and a high beam filament with a control circuit for switching the high beam filament on if the low beam filament should burn out, and conversely, to switch the low beam filament on if the high beam filament should burn out. However, it is not safe to drive in traffic with high beams. Therefore, a control circuit which simply switches a headlamp from low beam to high beam in case the low beam filament burns out is believed to be unsafe.

SUMMARY OF THE INVENTION

The present invention is a safety lighting circuit which keeps an automotive lamp lit when a filament burns out and assures that the lamp is not too bright for safe driving. The invention includes alternative embodiments. In one embodiment, a headlamp has a low beam filament and a high beam filament, and the control circuit includes a current limiting element and a switching device for switching from the low beam to the high beam if the low beam should burn out and for simultaneously limiting current flow through the high beam filament to reduce its brightness to a safe level. A rectifier or a relay is provided to prevent feedback. In another embodiment, a headlamp has two low beam filaments plus at least one high beam filament, and the control circuit includes a switching device for switching from one low beam filament to the other low beam filament in case the first low beam filament burns out. If two high beam filaments are provided in the latter lamp, the control circuit may be arranged to switch from one high beam filament to the other in case the first high beam filament burns out.

Accordingly, it is the object of the present invention to provide an improved safety lighting circuit for automotive vehicles.

Another object of the invention is to provide a lighting control circuit for keeping an automotive headlamp lit when a filament burns out and at the same time assuring that the lamp is not too bright for safe driving.

A further object of the invention is to provide a lighting control circuit for a lamp having a low beam filament and a high beam filament, the circuit including a switching device for switching from the low beam filament to the high beam filament in case the low beam filament should burn out, and a current limiting element for limiting current flow through the high beam filament after such switching to reduce the brightness of the high beam filament to a safe level.

A further object of the invention is to provide a lighting circuit including a lamp having two low beam filaments plus a high beam filament, and a switching device for switching from one low beam filament to the other in case the first low beam filament should burn out. The same lamp may have two high beam filaments if desired, and an extra switching device for switching from one high beam filament to the other in case the first high beam filament should burn out.

Another object of the invention is to provide an automotive lamp with a built in circuit for switching between filaments of the lamp. The circuit may be incorporated within the lamp housing, or alternatively may be provided in an adaptor unit which attaches to the terminals of the lamp.

Other objects of this invention will appear in the following description and appended claims, reference being had to the accompanying drawings forming a part of this specification wherein like reference characters designate corresponding parts in the several views.

Figure 2:
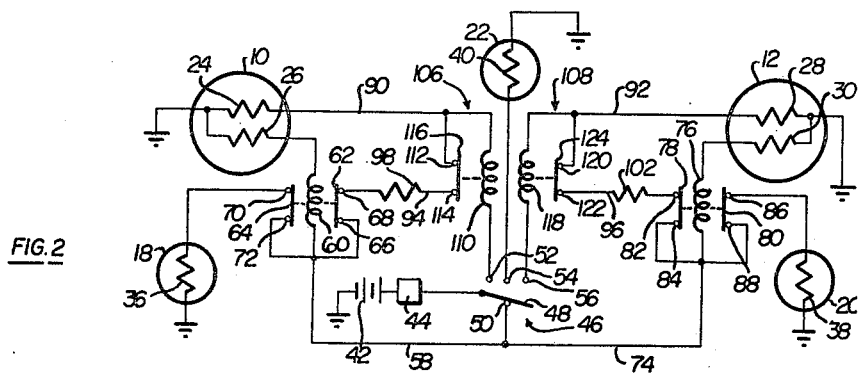
Figure 3:
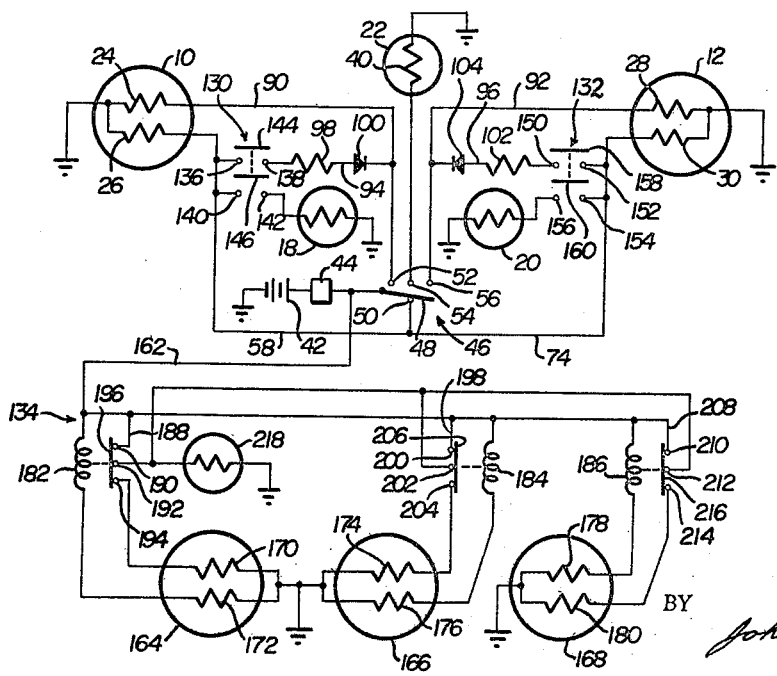
Figure 9:
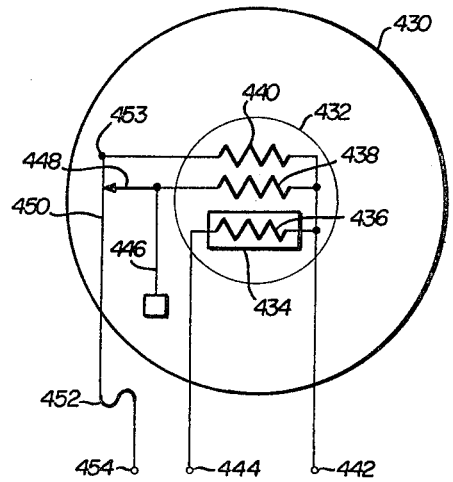
Figure 10:
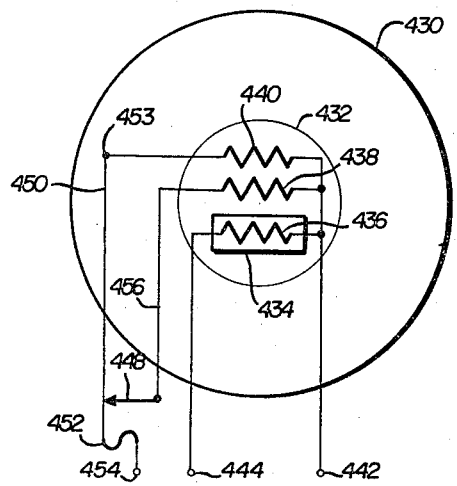
Figure 11:
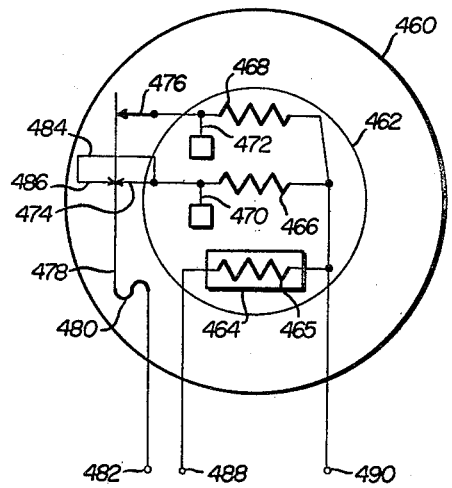
Figure 12:
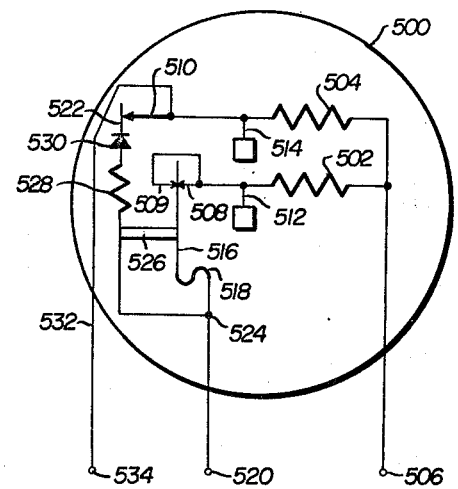

On the drawings:
FIGURE 1 is a schematic diagram of a lighting circuit in accordance with one embodiment of the invention;
FIGURE 2 is a circuit diagram of a modification of the embodiment of FIGURE 1;
FIGURE 3 is a circuit diagram similar to FIGURE 1 in which manual switching is provided rather than automatic switching, and in which lighting control for additional lamps of a vehicle is provided;
FIGURE 4 is a schematic diagram of a lighting circuit in accordance with another embodiment of the invention;
FIGURE 5 is a schematic diagram illustrating how a lighting control circuit may be incorporated in a headlamp;
FIGURE 6 is a schematic diagram illustrating how a modified control circuit may be incorporated in a headlamp;
FIGURE 7 shows a headlamp with an adaptor unit attached to the terminals of the headlamp;
FIGURE 8 shows a relay component;
FIGURE 9 shows an embodiment similar to FIGURE 5 in which switching is accomplished as a result of heating;
FIGURE 10 shows a modification of the embodiment of FIGURE 9;
FIGURE 11 shows another modification of the embodiment of FIGURE 9; and
FIGURE 12 shows a further modification.

As shown on the drawings:
The lighting circuit shown in FIGURE 1 includes two high-low beam headlamps 10 and 12, and two additional high beam headlamps 14 and 16. Also included are three small warning lamps 18, 20, and 22. The headlamps are mounted at the front of an automotive vehicle in the usual manner, and the warning lamps are mounted on the dashboard panel of the vehicle. Headlamp 10 includes a high beam filament 24 and a low beam filament 26, and headlamp 12 includes high beam filament 28 and a low beam filament 30. The filaments of lamps 14 and 16 are designated 32 and 34, respectively, and the filaments of lamps 18, 20 and 22 are designated 36, 38 and 40, respectively. One end of each of the filaments is grounded as shown.

Current is supplied from the electrical energy source of the vehicle which is shown as a battery 42. One side of the battery is grounded, and the other side is connected to a control switch 44 which is mounted on the dashboard panel of the vehicle and is operated to turn the lamps of the vehicle on and off. The control switch 44 may operate other lamps in addition to those shown in FIGURE 1, such as parking lamps, tail lamps, and the like, but these additional lamps have been omitted from FIGURE 1 to simplify the drawings. Contol switch 44 is connected to a foot switch 46 which has a movable contact 48 and four fixed contacts 50, 52, 54 and 56. Movable contact 48 has a low beam position in which it contacts fixed contact 50, and a high beam position in which it contacts the other three fixed contacts 52, 54 and 56. Movable contact 48 is shown in its low beam position.

Fixed contact 50 is connected by line 58 to a coil 60 of a relay which in turn is connected to the low beam filament 26. This relay also includes two movable contacts 62 and 64 which are controlled by coil 60. Movable contact 62 is associated with fixed contacts 66 and 68, and movable contact 64 is associated with fixed contacts 70 and 72. These relay contacts are normally closed as shown.

Fixed contact 50 of foot switch 46 is connected by line 74 to a coil 76 of another relay which is in turn connected to the low beam filament 30 of headlamp 12. This relay includes two movable contacts 78 and 80 which are controlled by coil 76. Movable contact 78 is associated with fixed contacts 82 and 84, and movable contact 80 is associated with fixed contacts 86 and 88. These contacts are normally closed as shown.

Referring again to foot switch 46, its fixed contact 52 is connected by a line 90 to the high beam filament 24 of headlamp 10, and its fixed contact 56 is connected by a line 92 to the high beam filament 28 of the headlamp 12. The other fixed contact 54 of foot switch 46 is connected to the filaments of high beam headlamps 14 and 16 and also to the filament of one high beam warning lamp 22.

A branch circuit 94 is connected between lines 58 and 90 and another branch circuit 96 is connected between lines 74 and 92. Branch circuit 94 includes contacts 66 and 68, a resistor 98 and a rectifier 100, all connected in series. Branch circuit 96 includes contacts 82 and 84, a resistor 102 and a rectifier 104 all connected in series. These branch circuits serve as alternate paths for energizing the high beam filaments 24 and 28, as will be described.

Line 58 is connected to fixed contact 72 and fixed contact 70 is connected to the warning lamp 18 to provide a path for energizing this warning lamp. Similarly, line 74 is connected to fixed contact 88, and fixed contact 86 is connected to the warning lamp 20 to provide a path for energizing this warning lamp.

The operation of the circuit of FIGURE 1 will be described starting with the condition that movable contact 48 of foot switch 46 is in contact with low beam fixed contact 50 as shown. The control switch 44 is operated to turn on the lighting system of the vehicle. Current is supplied from battery 42 through switch 44 and movable contact 48 to fixed contact 50, and this current divides and flows through lines 58 and 74, respectively, to the low beam filaments 26 and 30 of headlamps 10 and 12, thus lighting the low beams of the headlamps. The current in line 58 flows through relay coil 60 which pulls in movable contacts 62 and 64, thus opening the two branch circuits connected to line 58. Similarly, the current in line 74 flows through relay coil 76 which pulls in movable contacts 78 and 80, thus opening the two branch circuits connected to line 74.

If low beam filament 26, for example, burns out, current ceases to flow through relay coil 60. Therefore, movable contacts 62 and 64 close the associated fixed contacts. Current then flows from line 58 through movable contact 62, resistor 98, rectifier 100 and line 90 to the high beam filament 24 of lamp 10, thus energizing this filament. Fixed contact 52 is open, so there is no feedback of current. The value of resistor 98 is high enough to limit current in branch circuit 94 so as to reduce the brightness of high beam filament 24 to a safe level. As pointed out previously, it is not believed to be safe to drive an automotive vehicle for any extended period of time in traffic with the full high beams of a headlamp on. However, the resistor 98 reduces the brightness of the high beam of lamp 10 to a point where driving with this reduced intensity high beam on is safe and certainly substantially safer than driving with this headlamp out.

When current through relay coil 60 ceases due to the burning out of low beam filament 26 as described above, movable contact 64 closes fixed contacts 70 and 72. Thus, current flows from line 58 through movable contact 64 and the filament 36 of warning lamp 18. The warning lamp 18 lights to provide a visual indication to the driver of the vehicle that the low beam filament 26 has burned out. Thus, the driver is warned that repair of a headlamp is needed.

The relay coil 76 functions in the same manner as relay coil 60. Thus, if low beam filament 30 should burn out, current through coil 76 ceases, thus allowing movable contacts 78 and 80 to close against the associated fixed contacts. Current flows from line 74 through branch circuit 96, line 92 and the high beam filament 28, thus lighting the high beam of headlamp 12. However, the resistor 102 in branch circuit 96 reduces the high beam energizing current below the normal value to thereby reduce the brightness of the high beam to a point where it is safe for driving in traffic. The closing of movable contact 80 causes current to flow from line 74 through contact 80 and the filament 38 of warning lamp 20, thereby providing an indication to the driver that the low beam filament of headlamp 12 has burned out.

The foot switch 46 may be operated to turn on the normal high beams of the headlamps 10 and 12 and also to turn on the auxiliary high beam headlamps 14 and 16. When the foot switch 46 is depressed in the usual manner, movable contact 48 moves to a high beam position where it contacts the three fixed contacts 52, 54 and 56. Assuming that control switch 44 is still in the on position, current flows from battery 42 through switch 44 and movable contact 48 to the fixed contacts 52, 54 and 56. Part of this current flows through line 90 to high beam filament 24, thus turning on the normal high beam of headlamp 10. Current also flows from fixed contact 56 through line 92 and the high beam filament 28 of lamp 12 thus turning on the normal high beam of headlamp 12. The two rectifiers 100 and 104 are poled to prevent reverse current flow through branch circuits 94 and 96, thus preventing energization of the low beam filaments 26 and 30. Current also flows from fixed contact 54 through the filaments of high beam headlamps 32 and 34 and also through the filament of warning lamp 22. The headlamps 14 and 16 are merely auxiliary high beam headlamps, and may be omitted if desired. The warning lamp 22 indicates to the driver the full high beams have been energized. It will be understood that other types of indicators or warning devices could be substituted for the warning lamps 18, 20 and/or 22.

FIGURE 2 shows a modification of the circuit of FIGURE 1 wherein the same reference numerals are used for like parts. The only differences between the circuits of FIGURES 1 and 2 is that in FIGURE 2 the auxiliary high beam headlamps 14 and 16 of FIGURE 1 have been omitted, and the rectifiers 100 and 104 of FIGURE 1 have been replaced by the relays 106 and 108. Relay 106 includes a coil 110 connected in line 90, fixed contacts 112 and 114 connected in branch circuit 94, and a movable contact 116 which normally closes fixed contacts 112 and 114. Similarly, relay 108 includes a coil 118 connected in line 92, fixed contacts 120 and 122 connected in branch circuit 96, and a movable contact 124 which normally closes fixed contacts 120 and 122.

The operation of the circuit of FIGURE 2 is exactly the same as that of FIGURE 1 when the foot switch 46 is in the low beam position such that movable contact 48 contacts fixed contact 50. That is, if low beam filament 26 burns out, current flows through branch circuit 94 and line 90 to the high beam filament 24 and this current is limited by resistor 98 to reduce the brightness of the high beam filament 24 to a safe level. Similarly, if low beam filament 30 burns out, current flow through branch circuit 96 and line 92 to high beam filament 28, and this current is limited by resistor 102 to reduce the brightness of high beam filament 28 to a safe level. When the foot switch 46 is operated to move contact 48 to its high beam position, movable contact 48 contacts the three fixed contacts 52, 54 and 56. Current flows through lines 90 and 92 to the high beam filaments 24 and 28 to turn on the full high beams of headlamps 10 and 12. Current also flows through warning lamp 22 to indicate that the normal high beams of the headlamps are on. The current in lines 90 and 92 flows through coils 110 and 118 respectively, thus pulling in movable contacts 116 and 124. This opens the two branch circuits 94 and 96 to prevent reverse current flow through them, and thus keeps the low beam filaments 26 and 30 de-energized. Thus, the relays 106 and 108 serve the same function as rectifiers 100 and 104 in FIGURE 1.

FIGURE 3 shows a circuit which constitutes another modification of the circuit of FIGURE 1, and the same reference numerals are used for like parts. As compared to FIGURE 1, the circuit of FIGURE 3 differs in that the auxiliary high beam headlamps 14 and 16 have been omitted, two manual switches 130 and 132 have been used instead of the relays 60 and 76, and a tail lamp controlling circuit 134 has been added.

Manually operated switch 130 includes a pair of fixed contacts 136 and 138 connected in branch circuit 94, and another pair of fixed contacts 140 and 142 connected in the energizing path for warning lamp 18. Switch 130 also includes a movable contact 144 associated with fixed contacts 136 and 138 and another movable contact 146 associated with fixed contacts 140 and 142. Similarly, switch 132 includes a pair of fixed contacts 150 and 152 connected in branch circuit 96 and another pair of fixed contacts 154 and 156 connected in the energizing path for warning lamp 20. Switch 132 also includes a movable contact 158 associated with fixed contacts 150 and 152 and a movable contact 160 associated with fixed contacts 154 and 156. Switches 130 and 132 may be mounted on the dashboard of a vehicle.

With foot switch 46 in the low beam position such that movable contact 48 is in contact with fixed contact 50, and assuming that control switch 44 is on, current is supplied through lines 58 and 74 to the low beam filaments 26 and 30, thus turning on the low beams of headlamps 10 and 12. The manual switches 130 and 132 are open. If low beam filament 26 should burn out, the manual switch 130 is depressed to move movable contacts 144 and 146 to their closed positions. Current then flows through branch circuit 94 and line 90 to the high beam filament 24, and this current is limited by the resistor 98 to reduce the brightness of the high beam filament to a point where it is safe. Current also flows through warning lamp 18, thus lighting this lamp to indicate to the driver of the vehicle that the low beam filament of the headlamp 10 has burned out.

If low beam filament 30 should burn out, switch 132 is closed to energize high beam filament 28 with reduced current and to turn on warning lamp 20.

The tail lamp controlling circuit 134 is connected to control switch 44 by line 162 to receive current from battery 42 when switch 44 is operated to turn on the lamps. Circuit 134 includes two tail lamps 164 and 166 and a license plate lamp 168. Lamp 164 has two filaments 170 and 172, lamp 166 has two filaments 174 and 176, and lamp 168 has two filaments 178 and 180. Each of these filaments is grounded at one end as shown. Line 162 is connected to filaments 172, 176 and 178 respectively through relay coils 182 and 184 and 186. The line 188 which includes fixed contacts 190, 192 and 194 is connected between line 162 and filament 170. Relay coil 182 operates a movable contact 196 which normally closes fixed contacts 190, 192 and 194. A line 198 which includes fixed contacts 200, 202 and 204 is connected between line 162 and filament 174 of lamp 166. Relay coil 184 operates a movable contact 206 which normally closes fixed contacts 200, 202 and 204. Similarly, a line 208 which includes fixed contacts 210, 212 and 214 is connected between line 162 and filament 180 of lamp 168. Relay coil 186 operates a movable contact 216 which normally closes fixed contacts 210, 212 and 214.

A warning limp 218 is connected by parallel lines to fixed contacts 192, 202 and 212.

The operation of the tail lamp controlling circuit 134 will be described starting with the condition that switch 44 is turned on to supply current from battery 42 to line 162. This current divides and flows through relay coils 182, 184 and 186 to filaments 172, 176 and 178, thus energizing these filaments to light the tail lamps and license plate lamp. Coil 182 pulls in movable contact 196 to open line 188, coil 184 pulls in movable contact 206 to open line 198, and coil 186 pulls in movable contact 216 to open line 208. If filament 172 should burn out, current through coil 182 ceases. Movable contact 196 then closes against fixed contacts 190, 192 and 194. Current then flows through line 188 to filament 170, thus energizing this filament to keep the tail lamp 164 lit. At the same time, current flows from contact 192 through lamp 218 which is ordinarily mounted on the dashboard panel of the vehicle, so this lamp lights and indicates to the driver of the vehicle that one of the rear lamp filaments has burned out. The other lamps 166 and 168 operate similarly. Thus, if filament 176 burns out, relay coil 184 drops out, so movable contact 206 closes against fixed contacts 200, 202 and 204. Current then flows through line 198 and filament 174 to keep tail lamp 166 lit, and at the same time current flows from contact 202 to warning lamp 218 to indicate the condition. Similarly, if filament 178 burns out, relay coil 186 drops out, so movable contact 216 closes against contacts 210, 212 and 214. Current then flows through line 208 and filament 180 to keep license plate lamp 168 lit, and current also flows from contact 212 through warning lamp 218 to indicate the conditions.

FIGURE 4 illustrates another embodiment of the invention. In this embodiment, two high-low beam headlamps 220 and 222 are provided, these headlamps being mounted at the front of an automotive vehicle in the usual manner. Two auxiliary high beam headlamps 224 and 226 are also mounted at the front of the vehicle. Lamp 220 includes two low beam filaments 228 and 230 and two high beam filaments 232 and 234. Lamp 222 also includes two low beam filaments 236 and 238 and two high beam filaments 240 and 242. Lamp 224 includes two high beam filaments 244 and 246, and lamp 226 also includes two high beam filaments 248 and 250. All of these filaments are grounded at one end as shown. Current for operating these lamps is supplied from the energy source of the vehicle which is illustrated as the battery 252. The battery is connected to a control switch 254 which is operated to turn on and off the various lamps of the vehicle. It will be understood that other lamps in addition to those shown in FIGURE 4 may be controlled by switch 254. Control switch 254 is connected to a foot switch designated 256 which has two ganged movable contacts 258 and 260. Movable contact 258 is associated with fixed contacts 262 and 264, and movable contact 260 is associated with fixed contacts 266 and 268. Fixed contact 262 is connected through a relay coil 270 to low beam filament 228, and is also connected through fixed contacts 272 and 274 to another low beam filament 230. Similarly, fixed contact 266 is connected through a relay coil 276 to low beam filament 236, and is also connected through fixed contact 278 and 280 to the other low beam filament 238.

Fixed contact 264 is connected via line 282 to high beam filaments 232, 234, 244 and 246. Fixed contact 268 is connected via line 284 to high beam filaments 240, 242, 248 and 250. A relay coil 286 is connected between filament 232 and line 282, and fixed contacts 288 and 290 are connected between filament 234 and line 282. Coil 286 operates a movable contact 292 which normally closes against fixed contacts 288 and 290. A relay coil 294 is connected between filament 244 and line 282, and fixed contacts 296 and 298 are connected between filament 246 and line 282. Relay coil 294 operates a movable contact 300 which normally closes fixed contacts 296 and 298. A relay coil 302 is connected between filament 240 and line 284, and fixed contacts 304 and 306 are connected between filament 242 and line 284. Relay coil 302 operates a movable contact 308 which normally closes against fixed contacts 312 and 314.

The operation of the circuit of FIGURE 4 will be described starting with the condition wherein foot switch 256 is operated to turn on the low beam lights such that movable contacts 258 and 260 are respectively in contact with fixed contacts 262 and 266 as shown in FIGURE 4. It will be assumed that control switch 254 has been operated to turn on the lamps. Current flows from battery 252 through switch 254, and this current divides at junction 318. Current flows from junction 318 through movable contact 258, fixed contact 262, coil 270 and low beam filament 228 to ground, thus energizing filament 228 to provide a low beam from lamp 220. Current also flows from junction 318 through movable contact 260, fixed contact 266, coil 276 and low beam filament 236 to ground, thus energizing low beam filament 236 to provide a low beam from lamp 222. The current through coils 270 and 276 pulls in the movable contacts 271 and 277, thus open circuiting the other low beam filaments 230 and 238.

If low beam filament 228 should burn out, current through relay coil 270 ceases, and movable contact 271 then closes against fixed contacts 272 and 274. Current then flows throguh these contacts to the other low beam filament 230 of lamp 220 to keep the low beam of the lamp lit. Similarly, if low beam filament 236 should burn out, current ceases through relay coil 276, and movable contact 277 closes against fixed contacts 278 and 280. Current then flows through these contacts to low beam filament 238 to keep the low beam of lamp 222 on. If desired, warning lamps identical to lamps 18 and 20 of FIGURE 1 may be provided and connected with relay coils 270 and 276 in exactly the same manner as shown in FIGURE 1.

To operate the high beam filaments in the circuit of FIGURE 4, the foot switch 256 is depressed to move the movable contacts 258 and 260 to the right so that they respectively contact fixed contacts 264 and 269. Current flows from lines 282 and 284 through coils 286, 294, 302 and 310 to high beam filaments 232, 244, 240 and 248 to light the high beams of the lamps. These coils pull in movable contacts 292, 300, 308 and 316 to open circuit the alternate high beam filaments. If any one of the primary high beam filaments burns out, an alternate high beam filament is energized. Thus, if high beam filament 232 should burn out, current through coil 286 ceases, and movable contact 292 closes against fixed contacts 288 and 290. Current then flows from line 282 through alternate high beam filament 234 to keep the high beam of lamp 220 lit. If high beam filament 240 burns out, relay coil 202 drops out, and alternate high beam filament 242 is lit. Similarly, if high beam filament 244 burns out, filament 246 is lit, and if high beam filament 248 burns out, filament 250 is lit.

In the embodiment of FIGURE 4, it is believed to be more important to provide alternate low beam filaments in each of the lamps 220 and 222 than it is to provide alternate high beam filaments. Thus, high beam filaments 234 and 242, relay coils 286 and 302 and the associated contacts may be omitted if desired. Lamps 224 and 226 may be entirely omitted if desired.

FIGURE 5 shows circuitry like that of FIGURE 4 built into a headlamp. The headlamp is shown schematically with circuit components therein, and is not intended to illustrate details of mechanical construction. The headlamp has a glass face 320. Inside the headlamp there is a shield 322 which has an aperture 324 in it. A high beam filament 326 is mounted inside the headlamp in alignment with the aperture 324. Two low beam filaments 328 and 330 are also mounted inside the headlamp behind the shield 322 and offset from the aperture 324. One end of each of these filaments is connected to a terminal 332 for connection to ground potential, the other end of filament 326 is connected to a terminal 334 for receiving energizing potential from the battery of the vehicle. Terminal 336 is connected through a coil 338 to low beam filament 328. Terminals 336 and 334 correspond to terminals 262 and 264 in FIGURE 4, and thus are adapted to be connected to a foot switch for selecting the high beam filament or the low beam filaments as desired. The line between coil 338 and terminal 336 is connected to a movable contact 340 which is operated by coil 338. Movable contact 340 normally is in contact with a fixed contact 342 which in turn is connected to low beam filament 330. Another terminal 334 is connected through a coil 346 to a movable contact 348 which is biased against a fixed contact 350 connected to contact 342. The coil 346 and movable contact 348 act as a buzzer to provide a warning device. Terminal 344 may be grounded.

The circuit of FIGURE 5 operates much like that of FIGURE 4. When current is supplied to terminal 336, this current flows through coil 338 to low beam filament 328, thus energizing this filament to turn on the low beam of the headlamp 320. Since filament 328 is positioned behind a shield 322, the light from this filament does not shine directly out of the headlamp. Rather the light would be reflected from a reflector at the rear of the headlamp to provide a somewhat diffused low beam from the headlamp.

The current through coil 338 pulls in movable contact 340 to prevent current from flowing to the other low beam filament 330. However, if filament 328 should burn out, current to coil 338 ceases, thus allowing movable contact 340 to close against fixed contact 342. Current then flows from terminal 336 through movable contact 340 and through filament 330 to energize this low beam filament and thus keep the low beam of the headlamp lit. Filament 330 is also positioned behind the shield 322, so the light from this filament also is reflected from the reflector at the rear of the headlamp to provide a somewhat diffused low beam.

When filament 330 is switched into the circuit as just described, current flows from terminal 336 through movable contact 340, fixed contact 342, fixed contact 350, movable contact 348 and coil 346. The current in coil 346 pulls contact 348 away from fixed contact 350, thus opening the circuit. Contact 348 again closes against contact 350 so that current again flows through coil 346. This making and breaking of contacts 348 and 350 repeats very rapidly such that the contacts act as a buzzer. The buzzer is audible inside the vehicle to warn the driver of the vehicle that the primary low beam filament 328 has burned out. Obviously, it would be possible to use a dashboard mounted warning light such as warning light 18 in place of the buzzer just described.

FIGURE 6 shows schematically circuitry like that of FIGURE 1 incorporated in a headlamp. Again, this view is not intended to illustrate the structural details of a headlamp. Reference numeral 360 designates the glass face of a headlamp. Inside the headlamp, a shield 362 is mounted, and the shield has an aperture 364 in it. A high beam filament 366 is mounted in the headlamp in alignment with the aperture 364. A low beam filament 368 is mounted in the headlamp behind the shield 362 and offset from the aperture 364. One end of each of these filaments is connected to a terminal 370 for connection to ground potential. A terminal 372 is connected to high beam filament 366. A terminal 374 is connected through a coil 376 to low beam filament 368. The terminals 372 and 374 correspond to terminals 50 and 52 of FIGURE 1 in that they are adapted to be connected to a foot switch for selecting either the high beam filament or the low beam filament. The line between coil 376 and terminal 374 is connected to a movable contact 378 which is normally closed against a fixed contact 380. Contact 380 is connected through a resistor 382 and a rectifier 384 to the high beam filament 366. The line between resistor 382 and terminal 380 is connected to a fixed contact 386, and a movable contact 388 which is normally biased against contact 386 is connected through a coil 390 to terminal 392. Coil 390 and contacts 386 and 388 act as a buzzer.

When current is supplied to terminal 374, it flows through coil 376 to low beam filament 368, thus energizing this filament to provide a low beam from the headlamp. As previously explained, light from low beam filament 368 is reflected from a reflector at the rear of the headlamp so that a somewhat diffused beam is provided. The current through coil 376 opens or pulls in movable contact 378 so that current does not flow to filament 366. If low beam filament 368 should burn out, current through coil 376 ceases, and movable contact 378 closes against fixed contact 380. Current then flows from terminal 374 through movable contact 378, fixed contact 380, resistor 382, rectifier 384 and high beam filament 366. This energizes the high beam filament to provide a high beam of light from the headlamp. However, the resistor 382 reduces the current through filament 366 to thereby reduce its brightness so that it will not present a driving hazard. Current also flows through fixed contact 386, movable contact 388 and coil 390 to ground at terminal 392. This current through coil 390 pulls in movable contact 388. The current is then interrupted allowing contact 388 to close again. This making and breaking of contacts 386 and 388 repeats rapidly producing a noise which warns the driver of the vehicle that low beam filament 386 has burned out. Again, a warning light or other suitable warning device could be substituted for the buzzer formed by coil 390 and contacts 386 and 388.

FIGURE 7 simply illustrates a headlamp 400 with an adaptor unit 402 mounted on it. The headlamp 400 has terminals 404, 406, 408, 410 projecting from it which represent leads from filaments such as filaments 326, 328 and 330 in FIGURE 5. The adaptor unit 402 may contain all of the other circuitry shown in FIGURE 5, and this circuitry may have terminals 412, 414, 416 and 418 corresponding to terminal 344, 336, 334 and 332 in FIGURE 5. This view is merely intended to show that part of the circuitry may be incorporated in an adaptor unit for a headlamp.

FIGURE 8 illustrates a component 420 having four terminals 422, 424, 426 and 428. The component 420 is shown merely to illustrate that any of the relays shown in the other views may be provided in a sealed container having terminal leads. The housing of component 420 could, for example, be glass or plastic and could be evacuated and hermetically sealed to prevent atmospheric conditions from interfering with the operation of the relay.

FIGURE 9 illustrates a modification of the circuit of FIGURE 5. In FIGURE 9 reference numeral 430 designates the glass face of a headlamp. Inside the headlamp, a shield 432 is mounted, and the shield has an aperture 434 in it. A high beam filament 436 is mounted in the headlamp in alignment with the aperture 434. Two low beam filaments 438 and 440 are mounted in the headlamp behind the shield 432 and offset from the aperture 434. One end of each of the filaments 436, 438 and 440 is connected to a terminal 442 which is normally grounded. A terminal 444 is connected to the high beam filament 434. The left end of filament 438 as viewed in FIGURE 9 is extended and supported by a resilient support 446. A fixed contact 448 is provided on the extension of filament 438. Filament 440 is also extended to the left as viewed in FIGURE 9, and a metal arm 450 is connected at 453 to the extension. The arm 450 has a bend portion 452, and extends outside the headlamp to a terminal 454. Arm 450 normally is in contact with fixed contact 448 as shown in FIGURE 9.

When the headlamp of FIGURE 9 and the associated circuitry is provided in an automotive vehicle, terminals 444 and 454 are connected through a foot switch to the source of electrical energy of the vehicle. It will be assumed that the foot switch is in a position such that terminal 454 is connected to the source of electrical energy. When the headlight is turned on, current flows to terminal 454 and from there through arm 450 and filament 440 to ground at terminal 442. Initially, current also flows through arm 450, fixed contact 448 and filament 438 to ground at terminal 442. Thus, filaments 438 and 440 are both lighted initially. Since these filaments are connected in parallel circuit relation with each other, a relatively great amount of current flows through arm 450. This current heats up the arm 450 including bend portion 452. As bend portion 452 heats up, it expands and causes arm 450 to move away from fixed contact 448, thus terminating current through filament 438. The current in arm 450 is now reduced, and this current flows through filament 440. The latter current heats up filament 440 causing it to expand, and this expansion of filament 440 maintains arm 450 out of contact with fixed contact 448.

If filament 440 should burn out, current through this filament cease. Filament 440 and bend portion 452 of arm 450 then cool, and this allows arm 450 to again come in contact with fixed contact 448. At this time, current again flows through filament 438 so that this filament lights up. It may be noted that the light from filaments 438 and 440 is blocked by shield 432 which is opaque, but a reflector is provided at the rear of the headlamp to direct light through the glass face plate 430. As current flows through filament 438 and arm 450, both filaments 438 and bend portion 452 expand, but since the current through filament 438 alone is less than initial current which flows when both filament 438 and filament 440 are conducting, the expansion of bend portion 452 is not sufficient to move arm 450 away from contact 448. Thus, this contact remains closed and current continues to flow through filament 438. It may be noted that the resiliency of support 446 allows filament 438 and the extension thereof to expand and contract.

FIGURE 10 shows a modification of FIGURE 9, and the same reference numerals are used for like parts. The only difference between FIGURES 9 and 10 is that contact 448 is located outside the headlamp, and a wire 456 supports filament 438 rather than a separate support 446 as shown in FIGURE 9. Otherwise, the construction and operation of the circuit of FIGURE 10 is exactly like that described previously in connection with FIGURE 9.

FIGURE 11 shows another modification of the circuit of FIGURE 9, and since there are several differences between the two circuits, the same reference numerals are not used in these two figures. Reference numeral 460 designates the glass face of a headlamp. Inside the headlamp, an opaque shield 462 is mounted and the shield has an aperture 464 in it. A high beam filament 465 is mounted in the headlamp behind the shield 462 and in alignment with the aperture 464. Two low beam filaments 466 and 468 are mounted inside the headlamp behind shield 462 and offset from the aperture 464. As previously explained, light from low beam filaments 466 and 468 will be reflected from a reflector provided at the rear of the headlamp (not shown) and thus direct it out through the glass face plate 460 of the headlamp. Light from high beam filament 466 shines directly through the aperture 464.

Filaments 466 and 468 are extended to the left as shown in FIGURE 11, and these extensions are mounted on resilient supports 470 and 472. The left end of filament 466 has a fixed contact 474 and the left end of filament 468 has a fixed contact 476. A metal arm 478 is normally in contact with fixed contacts 474 and 476, and this arm has a bend portion 480 and an external terminal 482.

A bridge 484 extends from fixed contact 474 across arm 478 and has another fixed contact 486 positioned opposite contact 474 and spaced slightly from arm 478 when they are in the position shown in FIGURE 11. A terminal 488 is connected to the left end of high beam filament 465. The right ends of filaments 465, 466 and 468 are connected to a terminal 490 which is normally grounded.

When the headlamp and the associated circuitry in FIGURE 11 are mounted in an automotive vehicle, terminal 490 is grounded and terminals 482 and 488 are connected through a foot switch to the source of electrical energy of the vehicle. Assuming that the foot switch is actuated in such a position as to connect terminal 482 to the energy source and that the lights of the vehicle are turned on, current will flow from the energy source through terminal 482 and from there through arm 478 which is in contact with fixed contacts 474 and 476. Part of the current flows from fixed contact 474 through filament 466 to ground and terminal 490. The remainder of the current flows from contact 476 through filament 468 to ground at terminal 490. The current in arm 478 causes bend portion 480 to expand thus moving arm 478 away from contacts 474 and 476 and into contact with fixed contact 486. Thus, current through filaments 468 terminates, but current through filament 466 is momentarily interrupted and re-established when arm 478 contacts fixed contact 486. If filament 466 should burn out, current through arm 478 ceases. Filament 466 and bend portion 480 then cool enough to allow arm 478 to move back to the position shown in FIGURE 11 wherein it contacts fixed contacts 474 and 476. Current then will flow through arm 478 and through filament 468 to ground at terminal 490. Even though filament 468 and bend portion 480 will expand due to the heating effect of the latter current, the current is lower than that which flows when both filaments 466 and 468 are conducting, so the expansion is not sufficient to move arm 478 away from contact 476. Thus, filament 468 stays lit. To light the high beam filament 465, the foot switch (not shown) is operated to connect terminal 488 to the source of electrical energy.

FIGURE 12 shows a modification using only two filaments in a lamp 500. A low beam filament 502 and a high beam filament 504 are each connected at one end to a terminal 506 which is adapted to be grounded. Fixed contacts 508, 509 and 510 are provided at the other ends of the filaments as shown. Filament 502 has a support 512 and filament 504 has a support 514, and these supports allow expansion of the filaments. A movable conductive arm 516 having a bend portion 518 is connected to terminal 520 and normally contacts fixed contact 508. A branch path in the form of a movable conductive arm 522 is connected to arm 516 at 524 and normally contacts fixed contact 510. An insulating member 526 interconnects the two arms structurally. A resistor 528 and a rectifier 530 are connected in the branch path formed by arm 522. A primary circuit path 532 is connected from a terminal 534 to filament 504. The arm 516 constitutes another primary circuit path, while arm 522 constitutes a branch circuit path. The arms act as a switching means.

When the headlamp 500 is installed in a vehicle, terminal 506 is grounded, and terminals 534 and 520 are connected through a foot switch and a control switch to the electrical energy source of the vehicle in the manner illustrated in FIGURE 1. Of course, two such headlamps are normally provided. Assuming that the foot switch is operated so as to connect terminal 520 to the energy source and the control switch is on, current flows through arms 516 and 522 and through filaments 502 and 504 to light both filaments temporarily. This current heats bend portion 518 which expands causing arms 516 and 522 to move away from contacts 508 and 510, thus interrupting the current momentarily. Arm 516 then contacts fixed contact 509 so that current again flows through low beam filament 502 to light the low beam of the headlamp.

If filament 502 should burn out, current ceases and bend portion 518 cools. Arms 516 and 522 then move back into contact with contacts 508 and 510. Current then flows through high beam filament 504. This current passes through resistor 528 which reduces or limits the current to a level below the normal high beam current to thereby reduce the brightness of filament 504 to a safe level.

If the foot switch is operated to connect terminal 534 to the energy source, full high beam current flows through filament 504 to provide the normal high beam of the headlamp. Rectifier 530 is poled to prevent this current from flowing in the reverse direction through arm 522. Thus, the circuit of FIGURE 12 is similar to that of FIGURE 1.

The invention thus provides a lighting circuit for keeping a headlamp lit in case a low beam filament burns out. In FIGURES 1, 2, 3, 6 and 12, this is done by switching from the low beam filament to the high beam filament and reducing current to the high beam filament to reduce its brightness to a safe level. In FIGURES 4, 5, 9, 10 and 11, if one low beam filament burns out the circuitry switches on another low beam filament to keep the low beam of the headlamp lit. Switching between high beams may also be accomplished in the manner illustrated in FIGURE 4 if desired.

Having thus described my invention, I claim:

1. A lighting circuit for use with a current source of an automotive vehicle and including in combination, a high-low beam headlamp having a low beam filament and a high beam filament, a first primary circuit path connected to said low beam filament, a second primary circuit path connected to said high beam filament, a branch circuit path connected between said primary circuit paths, said primary circuit paths being adapted to be connected to said current source, switching means having contacts in said branch circuit path and operable to make and break said branch circuit path, current limiting means in said branch circuit path, said switching means being operable to open said branch circuit path to allow selective energization of said low beam filament through said first primary circuit path and further being operable upon burning out of said low beam filament to complete said branch circuit path to energize said high beam filament with said current limiting means serving to reduce branch circuit current flowing in a forward direction to said high beam filament to reduce the brightness thereof to a safe level, first means connected in circuit with said branch circuit path to prevent flow of current in a reverse direction therein, and second means connected in circuit with said second primary circuit path between said branch circuit path and said source to prevent flow of current in a reverse direction in said second primary circuit path when current is flowing in the branch circuit path.

2. The lighting circuit as claimed in claim 1 in which said switching means comprises a relay having a coil connected in said first primary circuit path between said branch path and said low beam filament, fixed contacts connected in said branch circuit path, and a movable contact operable to make and break said fixed contacts, said movable contact and said fixed contacts being normally closed.

3. A lighting circuit as claimed in claim 1 in which said switching means comprises a manually operable switch including fixed contacts in said branch circuit path, and a movable contact for making and breaking said fixed contacts.

4. A lighting circuit as claimed in claim 1 in which said current limiting means comprises a resistor.

5. A lighting circuit as claimed in claim 1 in which said first means comprises rectifier means in said branch circuit path for preventing reverse current.

6. A lighting circuit as claimed in claim 1 in which said lighting circuit is built into said headlamp.

7. A lighting circuit as claimed in claim 1 in which said switching means, said current limiting means, and portions of said circuit paths are built into an adaptor unit attached to said headlamp.

8. A lighting circuit as claimed in claim 1 further including a tail lamp for said vehicle having two filaments, a pair of further circuit paths connected respectively to said tail lamp filaments and adapted to be connected to said current source, a relay including a coil in one of said further circuit paths, fixed contacts in the other of said further circuit paths, and a movable contact operated by said coil to make and break said fixed contacts.

9. A lighting circuit as claimed in claim 8 further including a warning lamp connected to said other circuit path.

10. A lighting control circuit for use with an automotive vehicle having a current source and at least one high-low beam headlamp including a low beam filament and a high beam filament, said lighting control circuit including in combination a first primary circuit path for connection to said low beam filament, a second primary circuit path for connection to said high beam filament, a branch circuit path connected between said primary circuit paths, said primary circuit paths being adapted to be connected to said current source, switching means having contacts in said branch circuit paths and operable to make and break said branch circuit path, current limiting means in said branch circuit path, first means in circuit with said branch circuit path for allowing forward current flow from said first primary circuit path to said second primary circuit path but preventing reverse current flow in said branch circuit path, and second means in circuit with said second primary circuit path to prevent flow of current in a reverse direction therein when current is flowing in said branch circuit path, said switching means being operable to open said branch circuit path to allow selective energization of said low beam filament through said first primary circuit path and further being operable upon burning out of said low beam filament to complete said branch circuit path to energize said high beam filament with said current limiting means serving to reduce branch circuit current flowing to said high beam filament to reduce the brightness thereof to a safe level.

11. A lighting circuit as claimed in claim 1 in which said switching means includes thermally actuated means responsive to heat generated by current flow in said first primary circuit path to selectively open said branch circuit path to allow selective energization of said low beam filament through said first primary circuit path and further being responsive to cooling upon burning out of said low beam filament to complete said branch circuit path to energize said high beam filament with said current limiting means serving to reduce branch circuit current flowing to said high beam filament to reduce the brightness thereof to a safe level.

References Cited

UNITED STATES PATENTS

| | | | |
|---|---|---|---|
| 2,021,677 | 11/1935 | Barrett | 315—83 |
| 2,528,245 | 10/1950 | Riggins | 315—83 |
| 2,887,616 | 5/1959 | Sendel | 315—83 |
| 3,309,563 | 4/1967 | McKienzie | 315—83 |
| 3,316,441 | 4/1967 | Nallinger | 315—83 |

JAMES W. LAWRENCE, Primary Examiner

C. R. CAMPBELL, Assistant Examiner

U.S. Cl. X.R.

315—82